(12) United States Patent
Brooks et al.

(10) Patent No.: US 12,431,004 B2
(45) Date of Patent: Sep. 30, 2025

(54) USING UNIQUE IDENTIFIERS TO LIMIT DUPLICATE ALERT MESSAGES COMMUNICATED OVER A TELECOMMUNICATIONS NETWORK

(71) Applicant: T-Mobile USA, Inc., Bellevue, WA (US)

(72) Inventors: Terri Leigh Brooks, Prosper, TX (US); Timothy N. Dunn, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 373 days.

(21) Appl. No.: 18/190,741

(22) Filed: Mar. 27, 2023

(65) Prior Publication Data
US 2024/0331527 A1    Oct. 3, 2024

(51) Int. Cl.
G08B 25/00    (2006.01)
H04L 1/08    (2006.01)
H04W 76/50    (2018.01)

(52) U.S. Cl.
CPC ......... *G08B 25/007* (2013.01); *G08B 25/004* (2013.01); *H04L 1/08* (2013.01); *H04W 76/50* (2018.02)

(58) Field of Classification Search
CPC ... H04W 76/50; G08B 25/004; G08B 25/007; H04L 1/08
USPC ...................................................... 455/404.1
See application file for complete search history.

(56) References Cited

U.S. PATENT DOCUMENTS

| | | |
|---|---|---|
| 8,037,151 B1 | 10/2011 | Daly et al. |
| 8,199,885 B2 | 6/2012 | Ostermeier et al. |
| 8,200,183 B2 | 6/2012 | Aftelak et al. |
| 8,300,560 B2 | 10/2012 | Nowlan et al. |
| 8,326,260 B1 | 12/2012 | Bradish et al. |
| 8,422,987 B2 | 4/2013 | Kane et al. |
| 8,554,169 B2 | 10/2013 | Daly et al. |
| 8,826,327 B2 | 9/2014 | Adimatyam et al. |
| 8,832,731 B1 | 9/2014 | Sennett et al. |
| 9,137,563 B2 | 9/2015 | Stein |

(Continued)

FOREIGN PATENT DOCUMENTS

| | | |
|---|---|---|
| CN | 102217334 A | 10/2011 |
| CN | 106797262 A | 5/2017 |

(Continued)

*Primary Examiner* — Maria El-Zoobi
(74) *Attorney, Agent, or Firm* — Perkins Coie LLP

(57) ABSTRACT

An alert broadcast system can receive a first alert message indicating an emergency from an alert management system. The first alert message generated by an emergency alert originator can include a unique identifier associated with the emergency. The alert broadcast system can forward the first alert message to a first group of wireless devices and cause each of the first group of wireless devices to temporarily store the unique identifier. The alert broadcast system can receive a second alert message, including the unique identifier from the alert management system. The alert broadcast system can forward the second alert message to a second group of wireless devices. The respective wireless device can perform an action based on a determination that the respective wireless device has received the first alert message prior to receiving the second alert message and that the second alert message is partly duplicative of the first alert message.

20 Claims, 4 Drawing Sheets

(56) References Cited

U.S. PATENT DOCUMENTS

| | | |
|---|---|---|
| 9,183,731 B1 | 11/2015 | Bokhary |
| 9,262,907 B2 | 2/2016 | Gould et al. |
| 9,281,909 B2 | 3/2016 | Sennett et al. |
| 9,444,945 B1 | 9/2016 | Verma et al. |
| 9,472,091 B2 | 10/2016 | Stern et al. |
| 9,615,233 B2 | 4/2017 | Vainik et al. |
| 9,619,995 B2 | 4/2017 | Namazi et al. |
| 9,693,210 B2 | 6/2017 | Sennett et al. |
| 9,736,550 B2 | 8/2017 | Stein |
| 10,136,285 B2 | 11/2018 | Lienhart et al. |
| 10,269,229 B2 | 4/2019 | Stern et al. |
| 10,375,758 B2 | 8/2019 | Musgrove et al. |
| 10,499,204 B1 | 12/2019 | Lan et al. |
| 11,190,925 B2 | 11/2021 | Brooks et al. |
| 11,477,077 B1* | 10/2022 | Berg .................. H04L 41/0866 |
| 11,477,848 B2 | 10/2022 | Dizdarevic et al. |
| 11,576,027 B2 | 2/2023 | Hamilton et al. |
| 2008/0191863 A1 | 8/2008 | Boling et al. |
| 2014/0361874 A1 | 12/2014 | Mandalapu |
| 2020/0252780 A1* | 8/2020 | McClendon, IV ...... H04W 4/90 |
| 2021/0067972 A1 | 3/2021 | Mcgrath et al. |
| 2021/0329438 A1* | 10/2021 | Brooks .................. H04W 4/90 |
| 2021/0349066 A1* | 11/2021 | Chilla .................... G08B 21/14 |
| 2022/0141635 A1 | 5/2022 | Menon |
| 2022/0244745 A1* | 8/2022 | Bisht ........................ G08G 5/34 |
| 2022/0377520 A1 | 11/2022 | Kumar et al. |
| 2022/0405188 A1* | 12/2022 | Chibon ................ G06F 11/302 |
| 2022/0417722 A1 | 12/2022 | Kumar et al. |
| 2023/0007734 A1 | 1/2023 | Dizdarevic et al. |
| 2023/0085267 A1* | 3/2023 | Suh ....................... H04W 48/12 455/404.1 |

FOREIGN PATENT DOCUMENTS

| | | |
|---|---|---|
| CN | 105284168 B | 6/2019 |
| CN | 111448810 A | 7/2020 |
| CN | 108140298 B | 9/2021 |
| CN | 111279730 B | 5/2022 |
| EP | 1249140 A1 | 10/2002 |
| EP | 1784924 A1 | 5/2007 |
| EP | 2030369 A2 | 3/2009 |
| EP | 1209886 B1 | 2/2011 |
| EP | 2359613 A2 | 8/2011 |
| EP | 2484130 A1 | 8/2012 |
| EP | 2499850 A2 | 9/2012 |
| EP | 2534646 A1 | 12/2012 |
| EP | 2534823 A1 | 12/2012 |
| EP | 2260478 B1 | 7/2013 |
| EP | 2919213 A1 | 9/2015 |
| EP | 3314595 A1 | 5/2018 |
| EP | 3695629 A1 | 8/2020 |
| JP | 2008511262 A | 4/2008 |
| JP | 5502886 B2 | 3/2014 |
| JP | 5878543 B2 | 2/2016 |
| JP | 2016028344 A | 2/2016 |
| JP | 2018524752 A | 8/2018 |
| JP | 2020522155 A | 7/2020 |
| KR | 20110104216 A | 9/2011 |
| WO | 2009085876 A1 | 7/2009 |
| WO | 2009111410 A1 | 9/2009 |
| WO | 2010006246 A1 | 1/2010 |
| WO | 2010059735 A2 | 5/2010 |
| WO | 2011041357 A1 | 4/2011 |
| WO | 2011059308 A2 | 5/2011 |
| WO | 2012025918 A1 | 3/2012 |
| WO | 2014200887 A1 | 12/2014 |
| WO | 2015175081 A1 | 11/2015 |
| WO | 2016210110 A1 | 12/2016 |
| WO | 2017118918 A1 | 7/2017 |
| WO | 2017221104 A1 | 12/2017 |
| WO | 2018191605 A1 | 10/2018 |
| WO | 2018204362 A2 | 11/2018 |
| WO | 2019183607 A1 | 9/2019 |
| WO | 2020171931 A1 | 8/2020 |
| WO | 2021040882 A1 | 3/2021 |

* cited by examiner

USING UNIQUE IDENTIFIERS TO LIMIT DUPLICATE ALERT MESSAGES COMMUNICATED OVER A TELECOMMUNICATIONS NETWORK

BACKGROUND

Wireless Emergency Alerts (WEAs) are short alert messages generated and distributed by federal, state, or local alerting authorities. The WEAs can alert the public about natural or man-made threats (e.g., hurricanes, floods, wildfires, industrial disasters, pandemics, terrorist attacks, or child abductions). The WEAs are configured to be distributed at a targeted geographical area associated with an emergency via the Wireless Emergency Alert system to the Cellular Mobile Service Providers (CMSPs). For example, the WEAs are broadcast via cell sites of a wireless network to all wireless devices located within the targeted geographical area. The WEAs include text which may provide a brief description of an emergency, including the location and type of the emergency.

A WEA associated with a particular emergency is generally broadcast multiple times (e.g., an initial broadcast and multiple subsequent broadcasts) in an attempt to have the WEA received at all wireless devices located within the targeted geographical area at any time during the duration of the WEA. For example, a wireless device that has moved to the targeted geographical area after the initial broadcast of the WEA can receive a subsequent broadcast of the WEA. In addition, radio anomalies (e.g., wireless device in an elevator) sometimes occur which may keep the wireless device from receiving an iteration of the broadcast.

BRIEF DESCRIPTION OF THE DRAWINGS

Detailed descriptions of implementations of the present invention will be described and explained through the use of the accompanying drawings.

Figure 1:
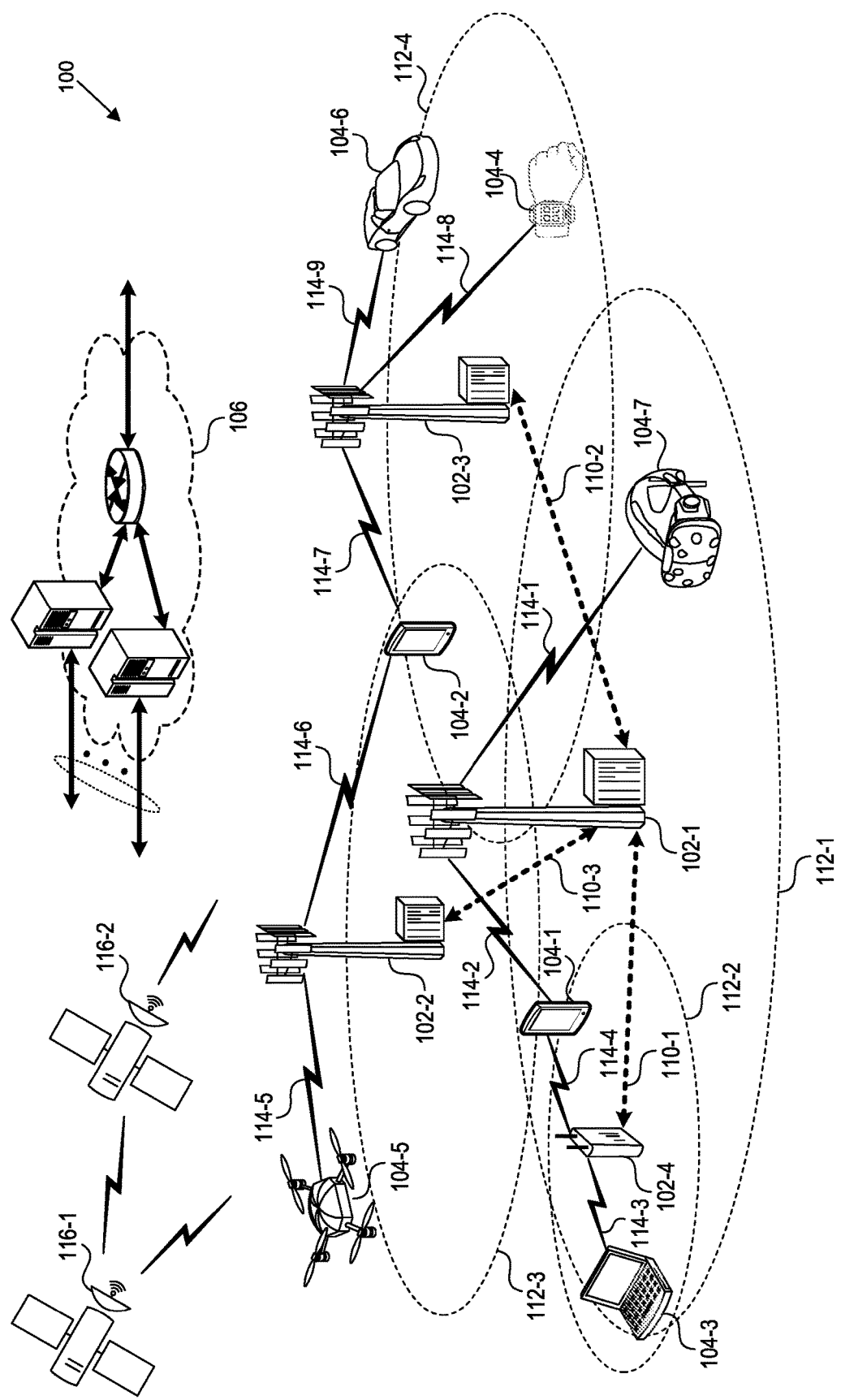
FIG. 1 is a block diagram that illustrates a wireless communications system that can implement aspects of the disclosed technology.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the disclosed technologies. Accordingly, while specific implementations are shown in the drawings, the technology is amenable to various modifications.

DETAILED DESCRIPTION

The disclosed technology relates to providing alert messages (e.g., emergency alert messages) to users of wireless devices in a wireless telecommunications network. An alert message can be generated by an alert originator (e.g., a federal, state, or county authority or agency) and forwarded by an alert management system (e.g., the Federal Emergency Management Agency (FEMA)) to CMSPs. The original alert may be followed with multiple minor updates which may also be presented, due to the current design of the WEA, and which may then appear as duplicates to the user. For example, a minor update can correspond to a change in the targeted area. Receiving an overwhelming number of alerts that appear as duplicates can cause alert fatigue that leads to ignored alert messages, or possibly missed alerts if the user decides to turn alert notifications off. The disclosed technology describes a system for limiting the number of perceived duplicate alert messages by applying a unique identifier generated by the alert originator to all alert messages (original and updates) associated with the same event. In particular, the disclosed technology can prevent presenting updated alert messages with changes which either do not need to be presented to users having already received a previous version of the alert, or which should be conveyed with modified presentation (e.g., no attention signal, vibration cadence, or a minimized version of either) because the changes to the alert information are minor.

In one example, an alert broadcast system associated with a telecommunications network can receive a first alert message indicating an emergency from an alert management system. The first alert message can include a unique identifier associated with the emergency. The unique identifier can be generated by an emergency alert originator associated with the first alert message. The alert broadcast system can forward the first alert message to a first group of wireless devices and cause a software application at each of the first group of wireless devices to temporarily store the unique identifier at the first group of wireless devices. The alert broadcast system can receive a second alert message associated with the emergency from the alert management system. The second alert message includes the same unique identifier. The alert broadcast system can forward the second alert message to a second group of wireless devices (possibly including some of the devices that received an earlier alert for the same event). The alert broadcast system can cause the software application at a respective wireless device of the second group of wireless devices to determine that the respective wireless device has received the first alert message prior to receiving the second alert message based on the unique identifier. The alert broadcast system can also cause the respective wireless device to determine that the second alert message is partly duplicative of the first alert message. The alert broadcast system can also cause the respective wireless device to perform an action based on the determination that the respective wireless device has received the first alert message prior to receiving the second alert message and that the second alert message is partly duplicative of the first alert message.

In another example, an alert broadcast system associated with a telecommunications network can receive a first alert message indicating an emergency. The first alert message can include a unique identifier generated by an alert originator. The alert broadcast system can forward the first alert message to a first group of wireless devices. The alert broadcast system can cause a software application at the first group of wireless devices to temporarily store the unique identifier. The alert broadcast system can receive a second alert message associated with the emergency. The second alert message can include the unique identifier. The alert broadcast system can forward the second alert message to a second group of wireless devices and cause the software application at a respective wireless device of the second group of wireless devices to determine that the respective wireless device has received the first alert message based on the unique identifier. The alert broadcast system can also cause the respective wireless device to perform an action based on the determination that the respective wireless device has received the first alert message.

In yet another example, a wireless device can receive a first alert message indicating an emergency from the alert broadcast system. The first alert message can include a first unique identifier associated with the emergency. The unique identifier can be generated by an emergency alert originator associated with the first alert message. The wireless device can temporarily store the unique identifier at the wireless device. The wireless device can receive a second alert message including a second unique identifier from the alert broadcast system. The wireless device can determine that the first alert message was received prior to receiving the second alert message and that the second alert message is partly duplicative of the first alert message based on the unique identifier. The wireless device can perform an action based on the determination that the wireless device has received the first alert message prior to receiving the second alert message and that the second alert message is partly duplicative of the first alert message.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs, including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also includes wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or another network. In an LTE/LTE-A network, the term eNB is used to describe the base stations 102, and in 5G new radio (NR) networks, the term gNBs is used to describe the base stations 102 that can include, among a variety of frequency bands, mmW communications. The network 100 can thus form a heterogeneous network 100 in which different types of base stations provide coverage for various geographic regions. For example, each base station 102 can provide communication coverage for a macrocell, a small cell, and/or other types of cells. As used herein, the term "cell" can relate to a base station, a carrier or component carrier associated with the base station, or a coverage area (e.g., sector) of a carrier or base station, depending on context.

A macrocell generally covers a relatively large geographic area (e.g., several kilometers in radius) and can allow access by wireless devices that have service subscriptions with a wireless network 100 service provider. As indicated earlier, a small cell is a lower-powered base station, as compared to a macrocell, and can operate in the same or different (e.g., licensed, unlicensed) frequency bands as macrocells. Examples of small cells include picocells, femtocells, and microcells. In general, a picocell can cover a relatively smaller geographic area and can allow unrestricted access by wireless devices that have service subscriptions with the network 100 provider. A femtocell covers a relatively smaller geographic area (e.g., a home) and can provide restricted access by wireless devices having an association with the femtocell unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices, such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100, including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies, including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support software applications that demand ultra-high quality service requirements and multi-terabits per second data transmission in the 6G and beyond era, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

Telecommunications System for Distributing Alert Messages

Figure 2:
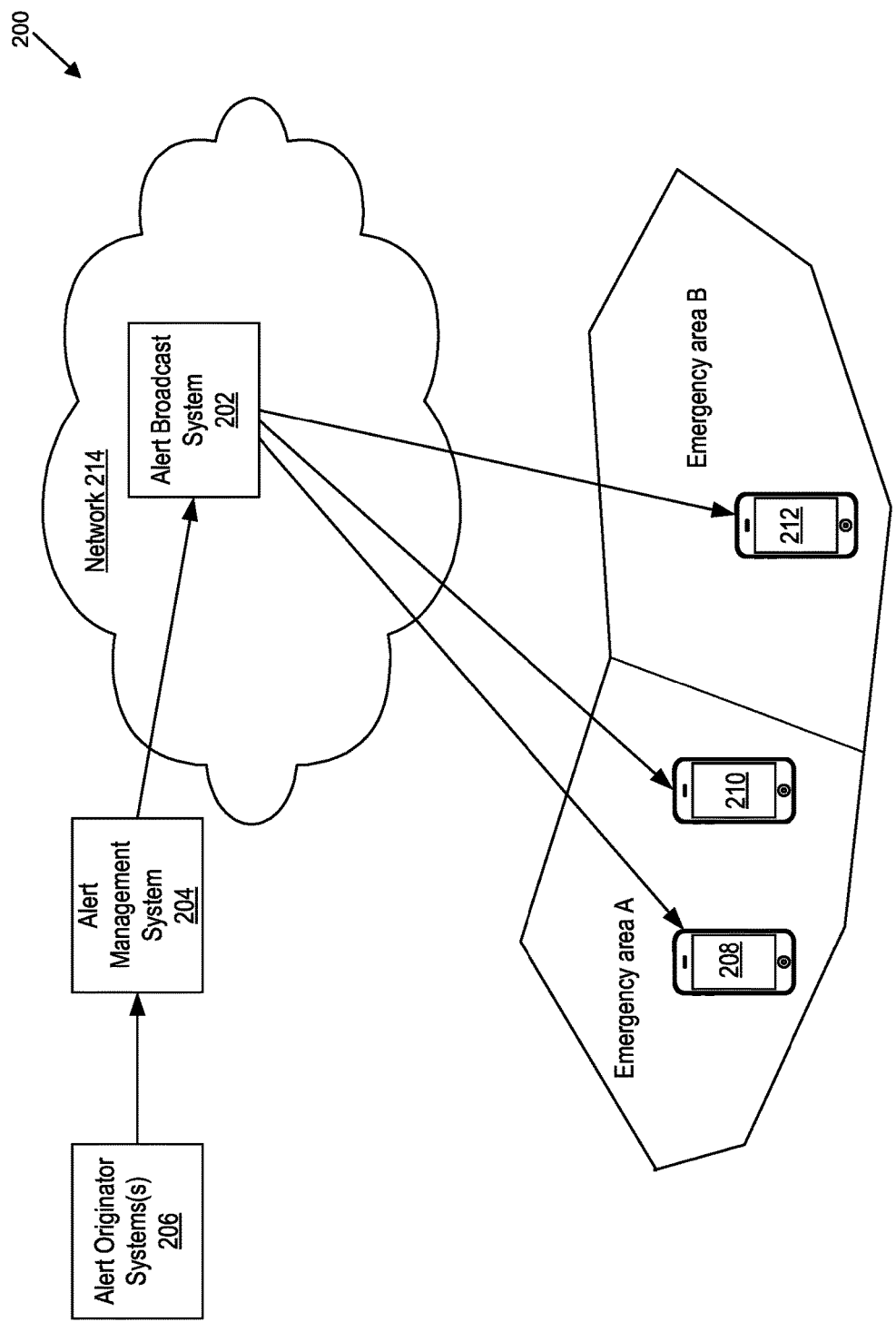
FIG. 2 is a system diagram that illustrates a telecommunications system for distributing alert messages.

FIG. 2 is a system diagram that illustrates a system 200 for distributing alert messages. The system 200 can include an alert broadcast system 202 (e.g., a CMSP), an alert management system 204, and an alert originator system 206 (or multiple alert originator systems). The alert broadcast system 202 can be associated with a telecommunications service provider and be configured to communicate with the alert management system 204 and/or the alert originator system 206 via a wireless network 214 (or multiple networks) associated with the telecommunications service provider. The system 200 can include, or be in communications with, a plurality of network cell sites (e.g., base stations 102-1 through 102-4 described with respect to FIG. 1). The system 200 is in communication with wireless devices (e.g., wireless devices 208, 210, and 212) by being communicatively coupled to the network 214 via the base stations. In some implementations, the wireless devices 208, 210, and 212 are associated with subscribers of the wireless network

214. The system 200 is configured to distribute alert messages (e.g., WEAs) generated by the alert originator system 206 to the wireless devices 208, 210, and 212 via the alert management system 204 and the alert broadcast system 202. The alert message is associated with a target geographical area (e.g., emergency area A and/or emergency area B). The alert message is distributed to the wireless devices located within the target geographical area.

The alert broadcast system 202 can include combinations of hardware and/or software to process data, perform functions, and communicate over the network 214. For example, the alert broadcast system 202 can include a processor, memory or storage, a transceiver, a display, an operating system, application software, and the like. Other components, hardware, and/or software included in systems that are well-known to persons skilled in the art are not shown or discussed herein for brevity. As shown in FIG. 2, the alert broadcast system 202 is communicatively coupled to the wireless devices 208, 210, and 212 and the alert management system 204. The alert broadcast system 202 is configured to process received alert messages and mediate a flow of data from the alert originator system 206 and the alert management system 204 to the wireless devices 208, 210, and 212. In order to broadcast an alert message to wireless devices within a target geographical area associated with the emergency, the alert broadcast system 202 can be configured to designate one or more cell sites (e.g., nodes 102 in FIG. 1) for passing the alert message to the network coverage area of the one or more designated cell sites. The target geographical area can be determined by the alert originator system (e.g., by geocode including a name of a city or a country, a zip code, or by addresses). For example, in an instance that an emergency is associated with an emergency area A, the alert broadcast system 202 can therefore designate appropriate cell sites to pass the alert message to all the wireless devices within the emergency area A (e.g., the wireless devices 208 and 210). The designation can be done based on cell sites or sectors associated with cell sites.

In some implementations, the processing of the alert messages by the alert broadcast system 202 includes generating a message identifier for respective alert messages (e.g., the message identifier is different from a unique identifier generated by the alert originator system 206). The message identifier can include a first portion associated with the received alert message (e.g., based on the alert characteristics) and a second portion including a serial number. The message identifier including the first portion and the second portion can be recognized by wireless devices. For example, a wireless device can identify an alert message that has already been presented to a user based on the message identifier and forgo presenting any subsequent broadcasts. However, in an instance that the alert originator system sends an updated alert message associated with the same emergency (e.g., having partially different alert characteristics), the alert broadcast system 202 would characterize the alert message as a new alert message and generate a new message identifier for such an updated alert message. The updated alert message would be broadcasted to the wireless devices within the area and the wireless devices would present the message to the wireless devices. In some incidences the updated alert message includes only minor updates (e.g., associated with time, location, or type of emergency) and would not be needed to be presented for subsequent times. For instance, an alert originator 202 can have expanded a target geographical area of an alert message from emergency area A to emergency area A and B. The broadcast of the updated information will now target emergency areas A and B, but users in county A may have already received the original alert message and may wish not to receive what appears to be a duplicate alert because the information that changed does not impact the users of the wireless devices in the emergency area A. Alternatively, the update can be a minor detail that may be perceived as a duplicate message. For example, the alert originator has provided a minor update to details associated with an emergency (e.g., change in a wind speed, estimated water fall, a typographical correction, or a minor change in estimated time associated with an emergency).

The alert originator system 206 (also referred to as an alert originator) is configured to generate and provide alert messages (e.g., WEAs) to be broadcasted via wireless telecommunications systems to the public via their wireless devices 208, 210, and 212 (e.g., electronic devices). The alert originator system 206 (or multiple alert originator systems) can be in communication with the alert management system 204 (e.g., The Integrated Public Alert & Warning Systems (IPAWS) operated by the Federal Emergency Management Agency (FEMA)). The alert originator system 206 can be associated with, for example, local, state, and federal public safety agencies (e.g., the police or border security agencies), the President, FEMA, and the National Weather Service. The alert originator system 206 can be configured to generate alert messages and communicate the alert messages to the alert management system 204. The alert management system 204 can be configured to process the alert messages received from the alert originator system 206 (e.g., including translation or authorization processing) and facilitate the distribution of alert messages to alerting disseminators. The alerting disseminators include wireless network service providers (e.g., Commercial Wireless Alert Service (CWAS)), such as the telecommunications system associated with the alert broadcast system 202. The alerting disseminators can also include other service providers, such as internet services and emergency alert systems associated with radio and television.

As an example, the National Weather Service (e.g., the alert originator system 206) generates an alert message that indicates a tornado threat in a particular geographical area. The National Weather Service communicates the alert message to FEMA (e.g., the alert management system 204) that processes and distributes (e.g., via IPAWS) the alert message to the alert broadcast system 202 of the wireless network 214, as well as other alert dissemination systems. The alert message is broadcast to wireless devices (e.g., the wireless devices 208, 210, and 212) located in the particular geographical area indicated for the tornado threat.

The alert messages can be associated with an emergency. The emergency can be associated with severe weather (e.g., hurricanes, tornadoes, blizzards, or flash floods), natural disasters (e.g., tsunamis, earthquakes, volcanic eruptions, or wildfires), child abductions (e.g., Amber alert), missing adult instances (e.g., Blue, Silver, or Clear alert), homeland security threats (e.g., terrorist attacks), nationwide emergency (e.g., National alerts), public health threats (e.g., pandemic associated alerts), shelter-in-place orders, or industrial disasters (e.g., chemical spills or explosions). In general, the emergencies associated with the alert messages cause such imminent threats to the public or to an individual that the authorities initiate broadcasting a widespread alert message to the public. Because the threats are imminent, it is very important to provide alert messages to the public fast. The alert messages target a particular area associated with the emergency. The alert messages can include information related to the emergency, such as the location and type of emergency. The information can further include instructions to the public on protective measures, information related to individuals involved with the emergency, or information on responsive authorities. In some implementations, the alert messages are associated with occurrences that do not necessarily include an emergency. For example, such alert messages can be used for distributing information to prevent emergencies or providing the public with other important information.

The alert messages generated by the alert originator system 206 can include unique identifiers that are associated with respective emergencies. Multiple alert messages can be associated with a single emergency, and each of the multiple messages can include the same unique identifier. The multiple alert messages can be duplicative or partly duplicative. For example, the system 200 may broadcast the same duplicative alert message multiple times to ensure that the wireless devices within a target geographic region will receive the message. The alert messages associated with the same emergency can also include updates (e.g., updates to the targeted geographic area, additional information, or update on the status) to the initially broadcasted alert messages. Such partly duplicative messages can include the same unique identifier as the originally sent alert message.

The unique identifier can be a series of symbols, letters, or numbers. The unique identifier can include a first portion that is associated with the alert originator and a second portion that includes a unique code (e.g., a serial code). For example, all alert messages generated by the National Weather Service include a first portion associated with the National Weather Service, all alert messages generated by a police department of a particular county include a first portion associated with the police department of the particular county, and so on.

The alert message can include a designation for a geographical area (e.g., the target geographical area A and/or B). The geographical area includes the area where the emergency is occurring or is expected to occur. For example, when an imminent threat is occurring in a downtown area of a city, the authorities (e.g., an alert originator or an alert management system or agency) can designate the area of the whole city to be the geographical area associated with the emergency. In some implementations, the geographical area includes one or more states, one or more counties, one or more towns, one or more metropolitan areas, any combinations thereof, or any other area that can be defined based on predefined boundaries. In some implementations, the geographical area includes a polygonal area. For example, the polygonal area could define a portion of a highway, a train line, a subway line, and a respective adjacent area, a waterbody (e.g., a river or a sea) and an adjacent area, a particular building (e.g., a skyscraper, a transit center, or a government building). In some implementations, the geographical area includes two or more portions that are separate. For example, the geographical area includes distinct cities or distinct buildings (e.g., all schools within a school district).

The wireless devices 208, 210, and 212 can be selected from any type of wireless device that can communicate with a network node and/or with another electronic device in a cellular, computer, and/or wireless communications system. Examples of such wireless devices include smartphones, tablet computers, laptop computers, wireless devices capable of machine-to-machine (M2M) communication, wearable electronic devices, movable Internet of Things devices (IoT devices), and any other handheld device that is capable of accessing the network(s) 100. Although only three wireless devices are illustrated in FIG. 2, the disclosed implementations can include any number of wireless devices.

The wireless devices 210 and 212 can include a software application that is associated with alert broadcast system 202. In some implementations, the software application is configured to activate in response to receiving an alert message from the alert broadcast system 202. The software application can enable communications between the wireless devices 208, 210, and 212 and the alert broadcast system 202. For example, a respective instance of a software application (e.g., a single copy of the software application software) operating on the wireless devices 208, 210, or 212 can receive an alert message from the alert broadcast system 202. Upon receiving the alert message, the respective instance of the software application activates and performs an action based on the received alert message related to the alert message. The action can include, for example, presenting the alert message to the user or blocking the alert message from being presented to the user. The type of action performed by the respective instance of the software application can be based on whether the wireless device has already received an alert message associated with the same emergency.

The wireless devices 208, 210 and 212 can store and transmit (e.g., internally and/or with other wireless devices over a network) signals, code (composed of software instructions), or data by using machine-readable media, such as non-transitory machine-readable media (e.g., machine-readable storage media, such as magnetic disks, optical disks, read-only memory (ROM), flash memory devices, and phase change memory) and transitory machine-readable transmission media (e.g., electrical, optical, acoustical, or other forms of propagated signals, such as carrier waves or infrared signals). The wireless devices 208, 210 and 212 can include hardware, such as one or more processors coupled to sensors and a non-transitory machine-readable media to store code and/or sensor data, user input/output (I/O) devices (e.g., a keyboard, a touchscreen, and/or a display), and network connections (e.g., an antenna) to transmit code and/or data using propagating signals. The coupling of the processor(s) and other components is typically through one or more buses and bridges (also referred to as bus controllers). Thus, a non-transitory machine-readable medium of a given electronic device typically stores instructions for execution on a processor(s) of that electronic device. One or more parts of an implementation of the disclosed technology can be implemented using different combinations of software, firmware, and/or hardware.

In some implementations, the wireless devices 208, 210, and 212 also include technology for providing information to the users of the devices. Such technology can include a display and/or a speaker. Providing information can include presenting visual messages, such as images or text displayed on a display of a respective wireless device. For example, presenting visual information can include displaying a text message or a map on a display. Providing information can also include providing audio messages, such as voice alerts or voice commands via a speaker of a respective wireless device.

The network 214 can include any combination of private, public, wired, or wireless systems such as a cellular network, a computer network, the Internet, and the like. Any data communicated over the network 214 can be encrypted or unencrypted at various locations or along different portions of the networks. Examples of wireless systems include Wideband Code Division Multiple Access (WCDMA), High-Speed Packet Access (HSPA), Wi-Fi, Wireless Local Area Network (WLAN), Global System for Mobile Communications (GSM), GSM Enhanced Data Rates for Global Evolution (EDGE) Radio Access Network (GERAN), 4G or 5G Wireless Wide Area Networks (WWAN), and other systems that can also benefit from exploiting the scope of this disclosure.

The system 200 can be configured to limit alert fatigue by limiting the amount of duplicate alert messages provided to users of the wireless devices. Alert fatigue refers to people's tendency to desensitize toward alert messages when receiving too many of them. In particular, receiving multiple messages that practically provide the same information can be problematic. User's experiencing alert fatigue may ignore the alert messages or turn off the ability to receive alert messages on their wireless devices.

In the system 200, the alert messages generated by the alert originator systems 206 include the unique identifiers associated with particular emergencies. The alert messages are to be provided for wireless devices in a target geographical area (e.g., the emergency area A and/or B). The alert messages, including the unique identifiers, can be distributed using the alert management system 204 and the alert broadcast system 202 to the wireless devices located in the target geographical area, (e.g., the wireless devices (208, 210, and/or 212)). Upon receiving an alert message, the wireless devices can be configured to store the unique identifiers in their memory and subsequently determine whether an alert message including the same unique identifier has already been received and displayed to the users based on the unique identifier. In an instance that the wireless device has displayed an emergency message including the same unique identifier, the wireless device forgoes displaying the duplicate or partly duplicate alert message. In an instance that the wireless device has not displayed an emergency message including the same unique identifier before, the wireless device will present the alert message to the user.

For example, the alert originator system 206 generates an initial alert message including a unique identifier to be sent to wireless devices located in the emergency area A (e.g., the wireless devices 208 and 210). The alert originator system 206 forwards the initial alert message to the alert management system 204, which processes the initial alert message and forwards it to the alert broadcast system 202. The alert broadcast system 202 further passes the initial alert message to wireless devices located in the emergency area A (e.g., the wireless devices 208 and 210). The wireless devices 208 and 210 receive the initial alert message and present it to their users (e.g., as a pop-up message on the respective displays of the wireless devices 208 and 210). The wireless devices 208 and 210 also store the unique identifier of the initial alert message in their memory. Subsequently, the alert originator system 206 generates an updated alert message. The updated alert message is associated with the same emergency as the initial alert message and therefore includes the same unique identifier. At this time, the location associated with the emergency has changed so that the relevant geographic area includes emergency area A as well as emergency area B. The alert originator system 206 forwards the updated alert message to the alert management system 204, which processes the updated alert message and forwards it to the alert broadcast system 202.

The alert broadcast system 202 can further pass the updated alert message to wireless devices located in emergency area A and emergency area B (e.g., the wireless devices 208, 210, and 212). The wireless devices 208, 210, and 212 can receive the updated alert message and perform a lookup for the unique identifier to determine whether the unique identifier has been stored in their memories prior to receiving the updated alert message. The wireless devices 208 and 210 in the emergency area A determine that the unique identifier included in the updated alert message is stored in their memory. This is an indication that the updated message is partly duplicative of the initial emergency message, and the wireless devices 208 and 210 do not present the updated emergency message on their displays. In contrast, the wireless device 212 in emergency area B determines that the unique identifier of the updated emergency message is not stored in its memory. The wireless device 212, therefore, presents it to a user of the wireless device 212. Similarly, any wireless devices that have moved to the emergency area A between the time of broadcasting the initial alert message and the updated alert message would present the updated emergency message to its user (i.e., as the wireless device did not receive the initial alert message).

In some implementations, the disclosed technology can be applied for wireless devices that are switching between different wireless network service providers (e.g., roaming). For example, a wireless device has been located in the target geographical area associated with an initial broadcast of an alert message while being connected to a first wireless network service provider. The wireless device has accordingly received the initial broadcast of the alert message and presented the alert message to a user. The wireless device then connects with a second wireless network service provider while located in the target geographical area. The wireless device can identify, based on the unique identifier associated with the alert message, that any subsequent broadcasts of the alert message are partly duplicative of the already presented emergency alert and forgo presenting them to the user.

In some implementations, the system 200 can be configured to evaluate the effectiveness of alert message delivery to wireless devices through the telecommunications network. The effectiveness of the alert message distribution can include determining, for example, the reliability, latency, and/or geographical accuracy of the alert message delivery. In such implementations, the wireless devices 208, 210, and 212 can be reference wireless devices that are located at particular positions within a geographical area (e.g., a network coverage area of the network 214). The reference wireless devices can be configured to receive alert messages distributed through the network 214 and store performance data associated with the received alert messages. The alert broadcast system 202 (or a different alert broadcast system in communication with the reference wireless devices) can be configured to receive the performance data from the reference wireless devices and evaluate the performance data for evaluation of the effectiveness of the alert message delivery.

In particular, the system 200 can be used to evaluate the delivery of alert messages generated by different alert originators (e.g., the alert originator system 206) because the alert messages delivered through the system include the unique identifiers. As described before, the unique identifiers can include a portion that is associated with a respective alert originator system. The performance data received from the reference can thereby be designated to different alert originator systems based on the unique identifiers and evaluated accordingly.

In some implementations, the effectiveness of the alert message delivery includes determining reliability, latency, and/or geographical accuracy. The reliability of alert message delivery can refer to the likelihood of the reference wireless devices receiving the broadcasted alert messages (e.g., above 70%, above 80%, above 90%, or above 95%). The latency of alert message delivery can refer to the average time it takes the reference wireless devices to receive the alert messages from the time the alert messages have been generated by the alert originator systems. The geographical accuracy of the alert message delivery can refer to the probability of the reference wireless devices located within the geographical area designated in the respective alert message receiving the alert messages. Similarly, the geographic accuracy of the alert message delivery can refer to the probability of the reference wireless devices located outside the geographical area designated in the respective alert message not receiving the alert messages.

For example, the reference wireless devices can be located near the edges of the network coverage area. In such implementations, the system 200 can be configured to evaluate the effectiveness of geofencing used for alert message delivery. A geofence refers to a virtual perimeter generated for a real-world geographic area. The alert messaging systems can use geofencing to define target areas for delivering particular alert messages. It is desirable that the delivery of the alert messages is blocked outside the geofenced area to prevent alert fatigue while delivering messages within the geofenced area.

The reference wireless devices can include wireless devices of different types. For example, the reference wireless devices can include mobile phones of different models and/or from different manufacturers. The reference wireless devices can be positioned stationary (e.g., not moving) or non-stationary (e.g., moving). Generally, reference wireless devices can be distributed within a geographical region so that the reference wireless devices provide an overall evaluation of the delivery of the alert messages. The geographical area can correspond to or include the network coverage area of the network 214. The wireless devices can be located in city centers, rural areas, near mountains, valleys, or water bodies, near tall buildings, or at different distances from base stations of the network 214 (e.g., the base stations 102 in FIG. 1), etc.

Figure 3:
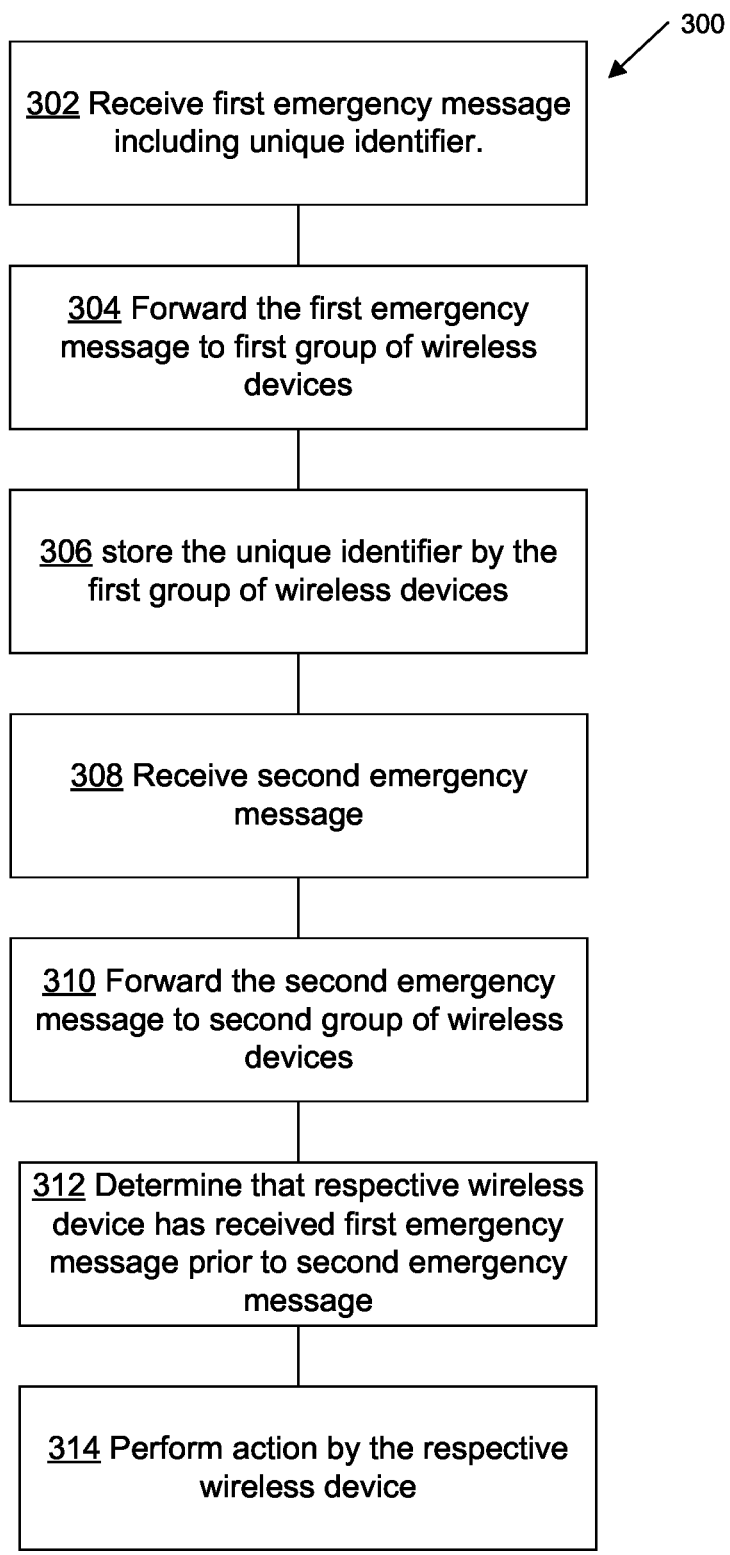
FIG. 3 is a flowchart that illustrates processes for providing alert messages to users of a wireless network by telecommunication systems.

FIG. 3 is a flowchart that illustrates processes 300 for providing alert messages to users of a wireless network by telecommunication systems. The processes 300 can be performed by a system associated with a telecommunications network (e.g., the system 200, including the alert broadcast system 202 in FIG. 2) in communications with wireless devices (e.g., wireless devices 208, 210, and 212) and an alert management system (e.g., the alert management system 204 in FIG. 2) and an alert originator system (e.g., the alert originator system 204). The alert broadcast system, the wireless devices, the alert management system, and the alert originator system can each include at least one hardware processor and at least one non-transitory memory-storing instruction. For example, the alert broadcast system, the wireless devices, the alert management system, and the alert originator system can correspond to a computer system 400 described with respect to FIG. 4. When the instructions are executed by the alert broadcast system, the wireless devices, the alert management system, and the alert originator system can perform the processes 300.

At 302, the alert broadcast system can receive a first alert message (e.g., a first WEA) indicating an emergency from the alert management system (e.g., FEMA). For example, the alert management system can receive the first alert message from the alert originator system and processes the first alert message. The alert management system can then forward the first message to the alerting disseminators, including the alert broadcast system associated with the telecommunications network. The first alert message can include information of a target geographical area that is associated with the emergency (e.g., the emergency areas A and/or B in FIG. 2). The emergency alert can also include a description and information associated with the emergency (a type of an emergency, estimated duration of the emergency, instructions associated with the emergency, etc.)

The alert message originators can include federal, state, or county authorities or agencies. Examples of alert originators include local, state, and federal public safety agencies (e.g., the police or border security agencies), the President, FEMA, and the National Weather Service. The alert message originators can be configured to generate alert messages within their authority. The emergency can be associated with any instance that can cause an imminent threat to individuals or the public. Examples of emergencies include instances associated with severe weather, natural disasters, child abductions, missing adult instances, homeland security threats, nationwide emergencies, public health threats, shelter-in-place orders, or industrial disasters.

The first alert message can include a unique identifier associated with the emergency. The unique identifier can be generated by an alert message originator associated with the first alert message. For example, the alert message originator can generate an alert message that includes a unique identifier. The unique identifier is associated with a particular emergency. The unique identifier is included in all the alert messages that the alert message originator generates related to the particular emergency.

In some implementations, the unique identifier can include a portion that is associated with the alert originator that generated the unique identifier. For example, an alert message generated by a particular local police authority can include a unique identifier having a first portion associated with the particular local police authority and a second portion that is a sequential or random number. All alert messages generated by the particular local police authority include the same first portion. The second portion of the unique identifier is specific to the emergency so that no two different emergencies within a particular time frame (e.g., 24 hours, 48 hours, or a week) are associated with the same second portion.

At 304, the alert broadcast system can forward the first alert message to a first group of wireless devices. For example, the first alert message is designated for a first geographical area (e.g., the emergency area A in Figure A). The alert broadcast system, therefore, forwards the first alert message to the wireless devices located within the boundaries of the first geographical area at the time of forwarding the first alert message (e.g., the wireless devices 208 and 210 in the emergency area A in FIG. 2).

In some implementations, the alert broadcast system's alert message can cause (e.g., by sending the first alert message) the software application at the first group of wireless devices to present the first alert message. The presenting can include displaying the first alert message on the respective displays of the first group of wireless devices. For example, upon receiving the first alert message, the wireless devices 208 and 210 present the first alert message on their respective displays. Additionally or optionally, the wireless devices 208 and 210 can output the first alert message as an audio message. The audio or visual message can further be accompanied by a haptic alert (e.g., a vibration).

At 306, the alert broadcast system's alert message can cause a software application at each of the first group of wireless devices to temporarily store the unique identifier at the first group of wireless devices. For example, the wireless devices 208 and 210 are configured to store the unique identifiers of the first emergency alert for a particular time (e.g., for 12 hours, 24 hours, 48 hours, or a week).

At 308, the alert broadcast system can receive a second alert message associated with the emergency from the alert management system. Similarly to the first alert message, the second alert message can be generated by the alert originator and processed by the alert management system. The alert management system then forwards the second alert message to the alert broadcast system. The second alert message includes the unique identifier (i.e., the same unique identifier that was included in the first alert message). The second alert message is therefore associated with the same emergency as the first alert message. The second alert message can be repetitive of the first emergency alert (e.g., duplicative) or an updated or edited version of the first alert message (e.g., partly duplicative). In some instances, an updated alert message can include a change to any information included in the alert message. Such change can include a change in the target geographical area, estimated duration of the emergency, update to conditions associated with the emergency, a correction to an error, etc. For example, in an instance that the emergency is associated with a storm, the update can include changes to detected conditions (e.g., rain fall or wind speed), a geographical area affected by the storm, an estimated duration of the storm, and/or update to evacuation instructions.

At 310, the alert broadcast system can forward the second alert message to a second group of wireless devices. The second group of wireless devices can be different from the first group of wireless devices. For example, the first group of wireless devices can be associated with a first geographical area, the second group of wireless devices can be associated with a second geographical area, and the second geographical area includes at least a portion of the first geographical area. For example, the first geographical area includes emergency area A in FIG. 2, and the second geographical area includes emergency areas A and B in FIG. 2. The emergency (e.g., a tornado threat) associated with the first and second alert messages has changed its location, and the alert originator has therefore expanded the area designated to receive the alerts.

In some implementations, the first group of wireless devices and the second group of wireless devices can be associated with a same geographical area. The first group of wireless devices can be located in the geographical area at the time of passing the first alert message, and the second group of wireless devices can be located in the geographical area at the time of passing the second alert message. The first group of wireless devices can be partly different from the second group of wireless devices because some wireless devices have entered the geographical area, and some have exited the geographical area between the time of passing the first alert message and the time of passing the second alert message. In some implementations, at least a portion of the wireless devices in the second group of wireless devices corresponds to a portion of wireless devices in the first group of wireless devices.

At 312, the alert broadcast system can cause the software application at a respective wireless device of the second group of wireless devices to determine that the respective wireless device has received the first alert message prior to receiving the second alert message based on the unique identifier. The determination includes determining that the second alert message is partly (or fully) duplicative of the first alert message. For example, the unique identifier of the first group of wireless devices can be temporarily stored in the respective databases of the first group of wireless devices. Determining that the respective wireless device has received the first alert message prior to receiving the second alert message by the software application at the respective wireless device can include performing a lookup at the respective databases.

At 314, the alert broadcast system can cause the respective wireless device to perform an action based on the determination that the respective wireless device has received the first alert message prior to receiving the second alert message and that the second alert message is partly duplicative of the first alert message. In some implementations, the action can include causing the respective wireless device to forgo presenting the second alert message by the respective wireless device. The system of the disclosed technology thereby is configured to prevent providing multiple emergency alerts associated with the same emergency to its users (e.g., subscribers of the wireless network). The system thereby enables limiting effects caused by alert fatigue (e.g., users being non-responsive to alert messages).

In some implementations, the action can include causing the respective wireless device to present a modified presentation to the user of the respective wireless device. The modified presentation of the second alert message is different from the presentation of the first alert message. For example, the modified presentation of the second alert message can be configured to be less disruptive than the presentation of the first alert message to avoid possible alert fatigue while still providing the information associated with the emergency to the user. For example, the presentation of the first message can include displaying the alert message on a display of the respective wireless device accompanied by a haptic effect (e.g., a vibration) and an audio effect. The presentation of the second alert message can include displaying the alert message on the display without the haptic and/or the audio alert. As another example, the presentation of the first alert message can require that a user clicks the displayed message in order to close the message on the display while the modified presentation of the second alert message can be displayed for a short period of time before closing automatically. Also, the presentation of the second alert message can be accompanied with a haptic and/or audio effect that is less noticeable (e.g., lower volume or lower vibration intensity) than the haptic and/or audio effect accompanying the first alert message.

In some implementations, the alert broadcast system can receive a third alert message associated with another emergency from the alert management system. The third alert message can be generated by the same alert originating system or a different alert originating system than the first and second alert messages. The third alert message can include a unique identifier of the third alert message. The alert broadcast system can cause (e.g., by sending the third alert message) the software application at the respective wireless device of the second group of wireless devices to determine that the third alert message is non-duplicative of the first alert message and/or the second alert message. The determination is performed based on a comparison between the unique identifier of the first alert message and the unique identifier of the third alert message (e.g., the wireless device performs a lookup described at 312). The alert broadcast system can cause the respective wireless device to present the third alert message (e.g., by displaying on a display device 418 in FIG. 4) by the respective wireless device. The alert broadcast system's alert message can also cause the respective wireless device to temporarily store the unique identifier of the third alert message at the wireless device. Any subsequently received alert messages including unique identifiers can be compared against the unique identifier of the first alert message and the unique identifier of the third alert message stored by the respective wireless device.

In some implementations, the alert broadcast system's alert message can cause the software application at the first group of wireless devices to remove the unique identifier from the first group of wireless devices after a predefined time after storing the unique identifier. The predefined time can be, for example, 12 hours, 24 hours, 48 hours, or a week.

In some implementations, the alert broadcast system can generate a message identifier for the first alert message. The message identifier can include a first portion associated with the received alert message (e.g., based on alert characteristics) and a second portion including a serial number. The alert broadcast system can include the message identifier to the first alert message when broadcasting the first alert message to the first group of wireless devices for the first time as well as for any subsequent broadcasts (e.g., the alert messages are broadcast to the first group of wireless devices iteratively). The message identifier is different from the unique identifier generated by the alert originator system. Both the message identifier and the unique identifier are received together with the first alert message by the respective wireless device. The message identifier and the unique identifier can be stored by the respective wireless device. Upon receiving subsequent alert messages, the respective wireless device can determine whether an alert message with the same message identifier or the same unique identifier has been stored by the respective wireless device. In response to a determination that the same message identifier or the same unique identifier has been stored by the respective wireless device, the respective wireless device performs the action. The respective wireless device can thereby use the message identifier to prevent presenting the first alert message (e.g., fully duplicative broadcasts of the first alert message) to the user multiple times. However, the message identifier is not applicable for preventing presentations or modifying the presentations of the second alert message (e.g., only partly duplicative presentations of the of first alert message). Instead, the wireless device can use the unique identifiers generated by the alert originator system to prevent presentation of the second alert message.

In some implementations, processes 300 performed by the system associated with the telecommunications network can include evaluating the effectiveness of alert message delivery (or distribution) from the alert originator system to the wireless devices (e.g., reference wireless devices) through the telecommunications network.

In such implementations, the alert broadcast system can receive alert messages indicating respective emergencies from the alert management system (e.g., as described with respect to 302). The alert messages can be generated by multiple different alert originators. For example, different alert originator authorities and agencies generate alert messages associated with different emergencies at different times. Each of the alert messages includes a unique identifier. For example, a respective unique identifier of the unique identifiers includes a portion specific for a respective alert originator of the multiple alert originators.

The alert broadcast system can forward multiple alert messages to wireless devices that are located within geographical areas indicated in the alert messages. The wireless devices include a group of reference wireless devices. The group of reference wireless devices is associated with the emergency alert system. The reference wireless devices are located at particular geographical locations within a coverage area of the telecommunications network.

The alert broadcast system alert messages can cause (e.g., by sending the multiple alert messages) a software application at each of the reference wireless devices in the group of reference wireless devices to receive the multiple alert messages and store performance data associated with the multiple alert messages to the group of reference wireless devices. Storing the performance data includes storing the unique identifiers of the alert messages (e.g., as described with respect to 306). The performance data can include, for example, a time when the reference wireless devices received each of the multiple alert messages.

The software application at the group of reference wireless devices can send the performance data to a different server system for processing. The server system is separate from the alert broadcast system and in communication with the group of wireless devices. The server system can evaluate the effectiveness of the alert message delivery from the respective alert originator to the group of reference wireless devices based on the unique identifier associated with the respective alert originator.

In some implementations, the effectiveness of the alert message delivery includes determining reliability, latency, and/or geographical accuracy (e.g., accuracy associated with geofencing). The performance data can also include information associated with a type of the respective wireless device of the group of wireless devices. The type of the respective wireless device can include, for example, the manufacturer and/or model of the wireless device.

Computer System

Figure 4:
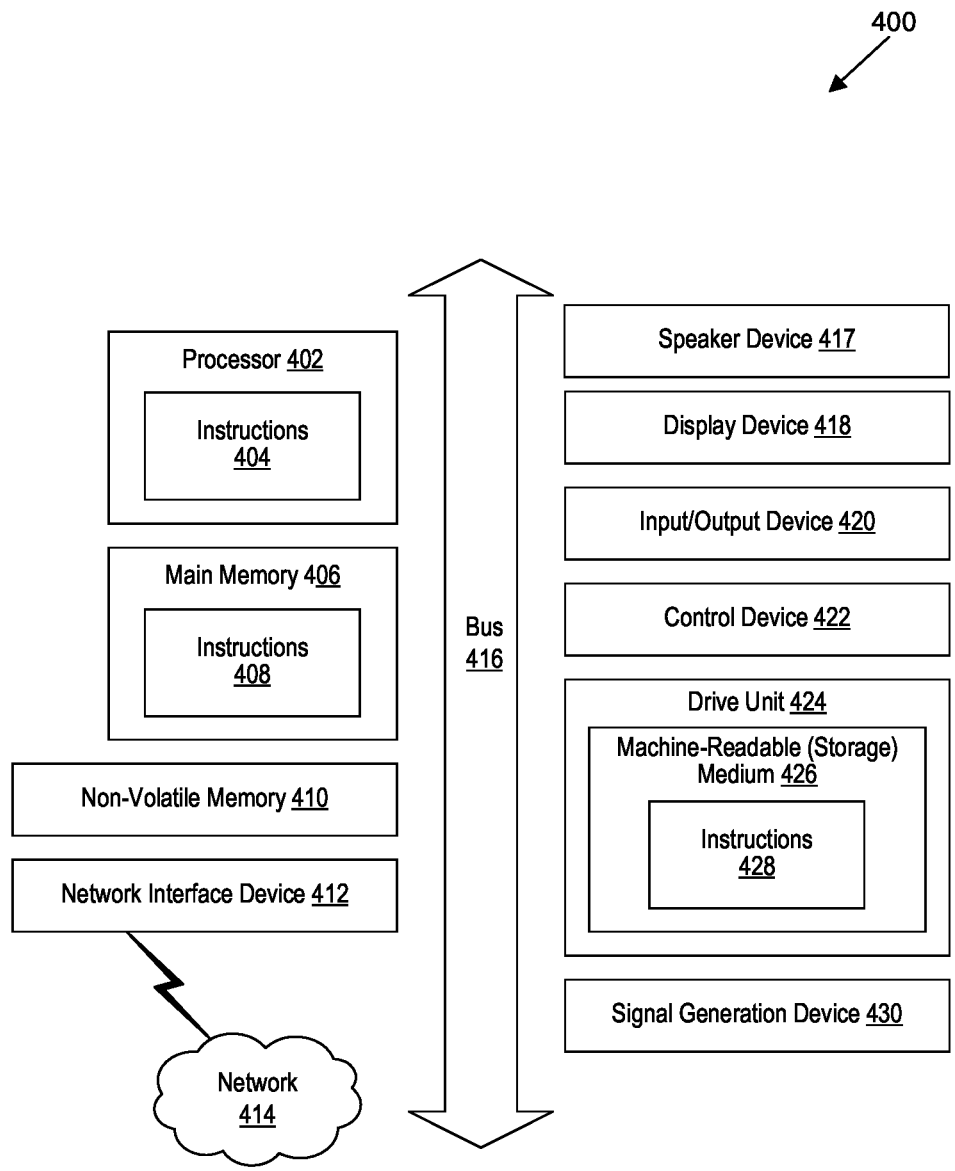
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementations, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in a computing device(s). When read and executed by the processor 402, the instruction(s) cause the computing system 400 to perform operations to execute elements involving the various aspects of the disclosure.

Remarks

The terms "example," "embodiment," and "implementation" are used interchangeably. For example, reference to "one example" or "an example" in the disclosure can be, but not necessarily are, references to the same implementation, and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described, which can be exhibited by some examples and not by others. Similarly, various requirements are described, which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps or employ systems having blocks in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computer-implemented method for providing alert messages to wireless devices through a telecommunications network, the method comprising:
   receiving, by an alert broadcast system associated with the telecommunications network from an alert management system, a first alert message indicating an emergency,
      wherein the first alert message includes a unique identifier associated with the emergency, and
      wherein the unique identifier is generated by an alert message originator associated with the first alert message;
   forwarding, by the alert broadcast system, the first alert message to a first group of wireless devices,
   causing, by an act of the alert broadcast system of sending of the first alert message, a software application at each of the first group of wireless devices to temporarily store the unique identifier at the first group of wireless devices;
   receiving, by the alert broadcast system of the telecommunications system from the alert management system, a second alert message associated with the emergency, wherein the second alert message includes the unique identifier,
   forwarding, by the alert broadcast system, the second alert message to a second group of wireless devices,
   causing, by an act of the alert broadcast system of sending of the second alert message, the software application at a respective wireless device of the second group of wireless devices to determine, based on the unique identifier, that the respective wireless device has received the first alert message prior to receiving the second alert message and that the second alert message is partly duplicative of the first alert message; and
   causing the respective wireless device to perform an action based on the determination that the respective wireless device has received the first alert message prior to receiving the second alert message and that the second alert message is partly duplicative of the first alert message.

2. The method of claim 1, wherein to cause the respective wireless device to perform an action, comprises:
   causing the respective wireless device to forgo presenting the second alert message by the respective wireless device.

3. The method of claim 1, further comprising:
   receiving, by the alert broadcast system of the telecommunications system from the alert management system, a third alert message associated with another emergency
      wherein the third alert message includes a unique identifier of the third alert message;
   causing, by an act of the alert broadcast system of sending of the third alert message, the software application at the respective wireless device of the second group of wireless devices to determine, based on a comparison between the unique identifier of the first alert message and the unique identifier of the third alert message, that the third alert message is non-duplicative of the first alert message; and
   causing the respective wireless device to present the third alert message.

4. The method of claim 1, further comprising:
   causing the software application at the first group of wireless devices to present the first alert message by the first group of wireless devices.

5. The method of claim 1, further comprising:
   causing the software application at the first group of wireless devices to remove the unique identifier from the first group of wireless devices after a predefined time after storing the unique identifier.

6. The method of claim 1, wherein:
   the first group of wireless devices is associated with a first geographical area,
   the second group of wireless devices is associated with a second geographical area, and
   the second geographical area includes at least a portion of the first geographical area.

7. The method of claim 1, wherein:
   the first group of wireless devices and the second group of wireless devices are associated with a geographical area,
   the first group of wireless devices are located in the geographical area at a time of passing the first alert message,
   the second group of wireless devices are located in the geographical area at a time of passing the second alert message, and
   the first group of wireless devices are partly different from the second group of wireless devices.

8. The method of claim 1, wherein:
   at least a portion of the wireless devices in the second group of wireless devices corresponds to a portion of wireless devices in the first group of wireless devices.

9. The method of claim 1, wherein:
   the unique identifier includes a portion that is associated with the alert originator that generated the unique identifier.

10. The method of claim 1, wherein:
    the unique identifier at the first group of wireless devices are temporarily stored at respective databases of the first group of wireless devices, and
    determining, by the software application at the respective wireless device, comprises performing a lookup at the respective databases.

11. A computer-implemented method for providing alert messages to wireless devices, the method comprising:
    receiving, by an alert broadcast system of a telecommunications network, a first alert message indicating an emergency,
       wherein the first alert message includes a unique identifier generated by an alert originator, and forwarding, by the alert broadcast system, the first alert message to a first group of wireless devices, causing, by an act of the alert broadcast system forwarding the first alert message, a software application at the first group of wireless devices to temporarily store the unique identifier;

receiving, by the alert broadcast system of the telecommunications system, a second alert message associated with the emergency,
  wherein the second alert message includes the unique identifier, forwarding, by the alert broadcast system, the second alert message to a second group of wireless devices, causing, by an act of the alert broadcast system forwarding the second alert message, the software application at a respective wireless device of the second group of wireless devices to determine, based on the unique identifier, that the respective wireless device has received the first alert message; and causing the respective wireless device to perform an action based on the determination that the respective wireless device has received the first alert message.

12. The method of claim 11, wherein to cause the respective wireless device to perform an action, comprises:
  causing the respective wireless device to forgo presenting the second alert message by the respective wireless device.

13. The method of claim 11, further comprising:
  receiving, by the alert broadcast system of the telecommunications system from an alert management system, a third alert message associated with another emergency,
    wherein the third alert message includes a unique identifier of the third alert message;
  causing the software application at the respective wireless device of the second group of wireless devices to determine, based on a comparison between the unique identifier of the first alert message and the unique identifier of the third alert message, that the third alert message is non-duplicative of the first alert message; and
  causing the respective wireless device to present the third alert.

14. The method of claim 11, further comprising:
  causing the software application at the first group of wireless devices to present the first alert message by of the first group of wireless devices.

15. The method of claim 11, further comprising:
  causing the software application at the first group of wireless devices to remove the unique identifier from the first group of wireless devices after a predefined time after storing the unique identifier.

16. The method of claim 11, wherein:
  the first group of wireless devices is associated with a first geographical area,
  the second group of wireless devices is associated with a second geographical area; and
  the second geographical area includes at least a portion of the first geographical area.

17. A wireless device in communication with an alert broadcast system associated with a telecommunications network, the wireless device comprising:
  at least one hardware processor; and
  at least one non-transitory memory-storing instruction for providing alert messages, the instructions, which, when executed by the at least one hardware processor, cause the wireless device to:
    receive, from the alert broadcast system, a first alert message indicating an emergency,
      wherein the first alert message includes a first unique identifier associated with the emergency, and
      wherein the unique identifier is generated by an alert message originator associated with the first alert message;
    temporarily store the unique identifier at the wireless device;
    receive, from the alert broadcast system, a second alert message including a second unique identifier;
    determine, based on the unique identifier, that the first alert message was received prior to receiving the second alert message and that the second alert message is partly duplicative of the first alert message; and
    perform an action based on the determination that the wireless device has received the first alert message prior to receiving the second alert message and that the second alert message is partly duplicative of the first alert message.

18. The device of claim 17, further caused to:
forgo presenting the second alert message by the respective wireless device.

19. The device of claim 17, further caused to:
receive, from the alert broadcast system, a third alert message associated with another emergency,
  wherein the third alert message includes a unique identifier of the third alert message;
determine, based on a comparison between the unique identifier of the first alert message and the unique identifier of the third alert message, that the third alert message is non-duplicative of the first alert message; and
present the third alert message by the wireless device.

20. The device of claim 17, further caused to:
present the first alert message by the wireless device.

* * * * *